(12) United States Patent
Hansen, Jr.

(10) Patent No.: US 7,687,930 B2
(45) Date of Patent: Mar. 30, 2010

(54) SOLAR/GEOTHERMAL POWERED THERMODYNAMIC HYDRO ELECTRIC GENERATING SYSTEM

(76) Inventor: Howard Otto Hansen, Jr., P.O. Box 149761, Orlando, FL (US) 32814

( * ) Notice: Subject to any disclaimer, the term of this patent is extended or adjusted under 35 U.S.C. 154(b) by 444 days.

(21) Appl. No.: 11/899,940

(22) Filed: Sep. 10, 2007

(65) Prior Publication Data

US 2009/0066086 A1     Mar. 12, 2009

(51) Int. Cl.
*F03B 17/02* (2006.01)
*F03B 13/12* (2006.01)

(52) U.S. Cl. .............................. 290/54; 290/43
(58) Field of Classification Search ........ 290/43, 290/44, 54, 55; 415/7
See application file for complete search history.

(56) References Cited

U.S. PATENT DOCUMENTS

| | | | | |
|---|---|---|---|---|
| 4,079,591 A | * | 3/1978 | Derby et al. | 60/641.8 |
| 4,095,118 A | * | 6/1978 | Rathbun | 290/2 |
| 4,311,011 A | * | 1/1982 | Lewis | 60/641.15 |
| 4,441,872 A | * | 4/1984 | Seale | 417/282 |
| 4,443,707 A | * | 4/1984 | Scieri et al. | 290/4 R |
| 4,757,960 A | * | 7/1988 | Paris et al. | 244/3.22 |
| 5,281,856 A | * | 1/1994 | Kenderi | 290/54 |
| 5,337,560 A | * | 8/1994 | Abdelmalek | 60/370 |
| 6,051,892 A | * | 4/2000 | Toal, Sr. | 290/43 |
| 7,579,700 B1 | * | 8/2009 | Meller | 290/43 |

* cited by examiner

*Primary Examiner*—Nicholas Ponomarenko

(57) ABSTRACT

A thermodynamic closed hydraulic electric generating system consisting of pressurized tanks, containing gas and liquid volumes interconnected by pipes. The system has a minimum of two tanks, one for heating and one for cooling. The heating source is solar, thermal or chemical. One tank is heated while the other is cooled, causing a significant pressure difference between the two tanks. Once one tank is heated to its optimum temperature and the other is cooled to its lowest temperature, a pressure valve is activated opening a regulated gate valve allowing the liquid in the higher pressure tank to flow through the connecting pipes and through a generator to the tank with the lower pressure and generating electric power. Liquid flow will occur until the tanks' pressure system equalizes, then the system is reversed. Tanks are heated by solar energy by parabolic mirrors and cooled by liquid/gas. Heat sinks promote heating/cooling.

1 Claim, 5 Drawing Sheets

SOLAR/GEOTHERMAL POWERED THERMODYNAMIC HYDRO ELECTRIC GENERATING SYSTEM

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF INVENTION

This inventor has sought out existing processes that uses a thermodynamic hydraulic electric generator system for use in creating electric power with no avail. While there are many hydro electric, fossil fuel and nuclear electric generating power plants, there are as yet no power plants that use the thermodynamic hydraulic method as described herein. There are solar panels and wind generators that produce electric energy, but they too are not like the process shown herein.

DETAILED DESCRIPTION OF THE INVENTION

Figure 1:
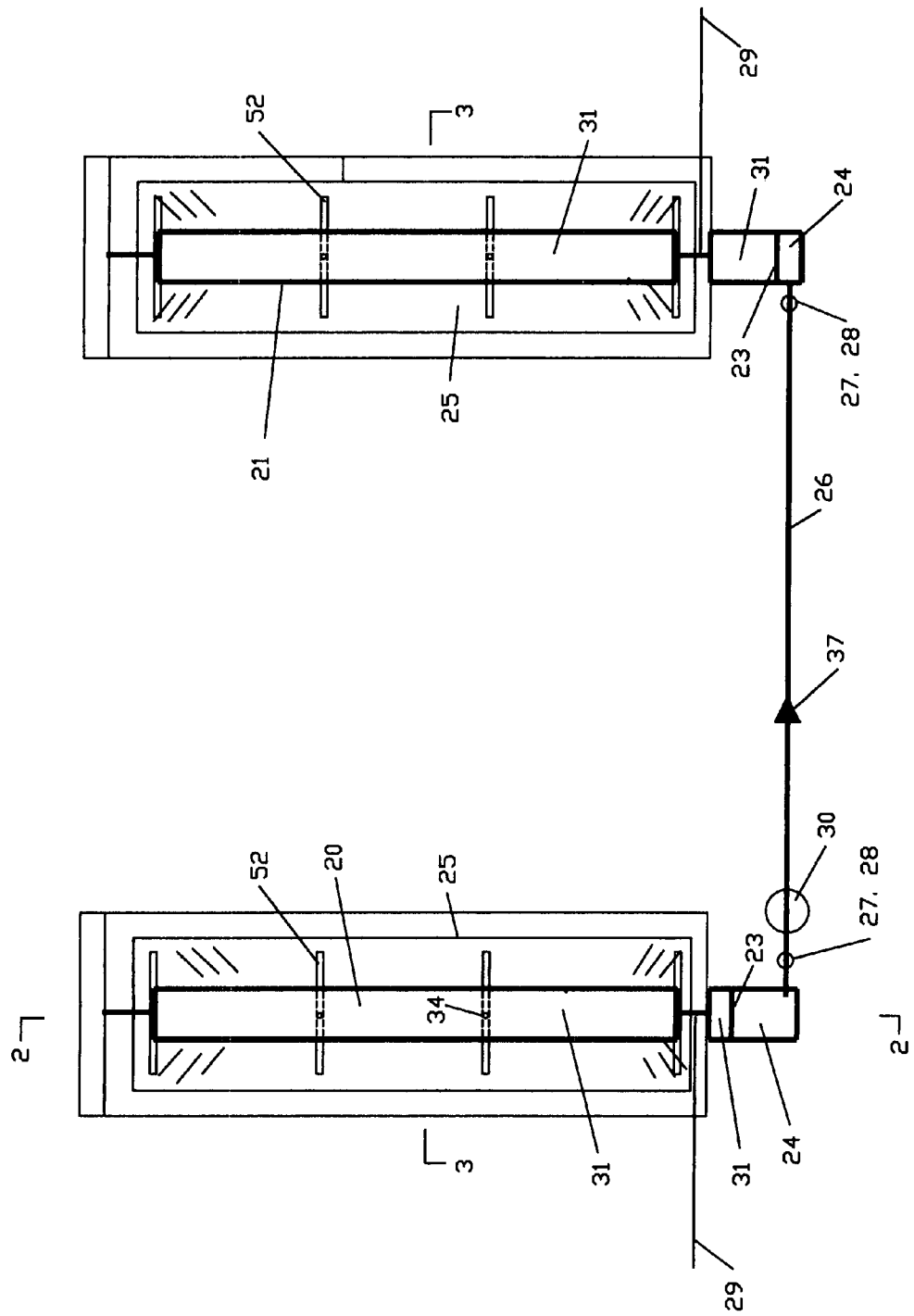
FIG. 1 is the plan view of the system which shows the two pressurized tanks with a parabolic mirror located beneath the tanks. It also shows the pipe connections from the tanks to the generator.

Refer to the drawing, there is illustrated in FIG. 1, tank 20 and tank 21 are initially set to an equilibrium pressure, temperature and volume at a starting time. Tank 20 and 21 contain a pressurized gas chamber 31, and liquid chamber 24 which is separated by a sliding insulated barrier 23. Pipes 26, connect to the tanks and to a generator 30. The liquid flow direction 37 is noted for this Figure. The pipes have gate valves, pressure valves and regulators 27, 28. The pipes are designed to connect to other pipes and tank systems 29. The tanks are located above a parabolic mirror that will direct solar energy that will focus on the tanks. When the system is activated, tank 20 will be heated to a temperature generated by the solar heat. The parabolic mirrors 25 will amplify the solar heat onto the tank 20. At the same time that tank 20 is heated, tank 21 will be cooled. The cooling process will consist of closing off the solar heat by spreading out a cover blanket then spraying the tank chamber of tank 21 with a cooling source, of liquid or gas. Once tank 20 reaches its optimum temperature and tank 21 reaches its coolest temperature the pressure valves 27 are activated and a regulated flow valve 28 will allow the liquid to discharge out of tank 20 through the connecting pipes 26 through the generator 30 to the receiving water chamber 24, located at tank 21. Electric power will be generated as the liquid passes through the generator. The liquid will flow from tank 20 system to tank 21 system until the gas pressure in tank 20 equals tank 21. The thermodynamics of the system are calculated by use of Boyles and Charles law. Power generated is calculated from standard equation for determining horse power when given the flow and pressure of a liquid. After the two tanks have a stabilized pressure tank 20 will under go the cooling process and tank 21 will begin the heating process and the cycle will repeat in the opposite direction. Slots, 52, are cut in the parabolic mirror to allow the mirror to rotate about the tank support columns, 34.

Figure 2:
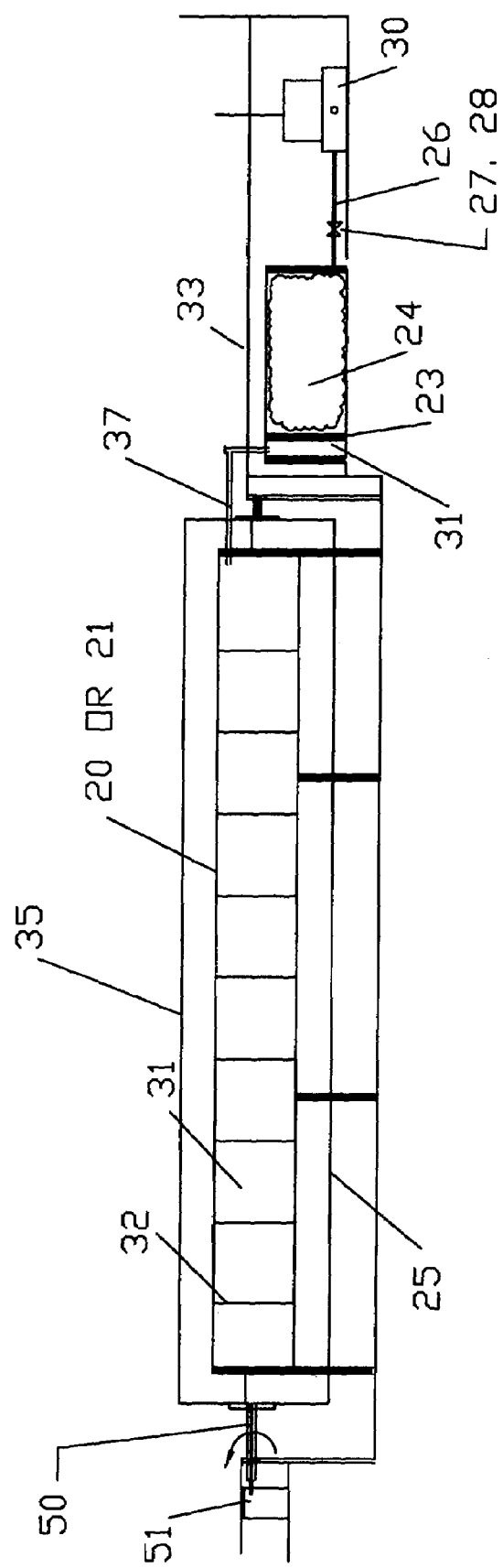
FIG. 2 is the detailed cross section running the length of the system which shows the tank and its interior. Inside the tank there are heat sinks and a gas and liquid chamber separated by a sliding insulated barrier.

Refer to FIG. 2, there is illustrated an intersection section 2-2 of FIG. 1 which shows the typical interior of tank 20 or 21 along its length. The interior of tank 20, which is also typical for tank 21, shows the gas chamber 31 and liquid chamber 24 which is separated by a sliding insulated barrier 23, and a polyethylene diaphragm 33 which encloses and holds the liquid 24. The connecting pipe 26 is shown which connects to a generator 30 that produces electrical power when the liquid flows out of one of the tanks and into the other tank. Solar energy is transferred from the tank shell to the tank interior by means of heat sinks, 32. The parabolic mirror 25, will rotate about the tanks to achieve maximum solar. The parabolic mirrors are rotated by a motor and shaft 50 and 51. The gas outfall pipe, 37, will be insulated to maintain a constant temperature.

Figure 3:
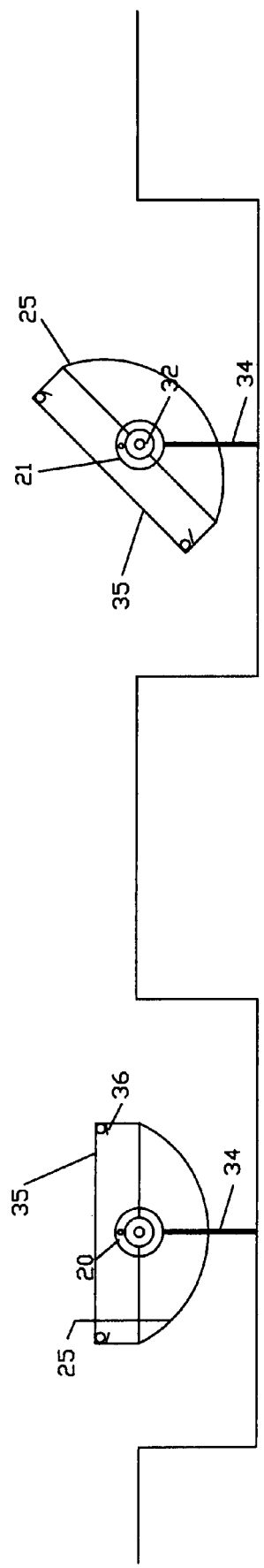
FIG. 3 is the detailed cross section running across the width of the system which shows the tanks and the heating mirrors about the tanks.

Refer to FIG. 3, there is illustrated an intersection 3-3 of FIG. 1 which shows the cross section through the tank system width. It shows tank 20 and 21 which are have parabolic mirrors 25 and heat sinks 32, tank supports 34 and a open and closed cover system 35. The mirrors 25 are parabolic shaped to reflect sun light on the tanks to amplify the light to get the most heat. During a cooling cycle tank 21 will be sprayed with a cool gas or liquid 36 and the cover at the tank 35 will be closed off from solar heating.

Figure 4:
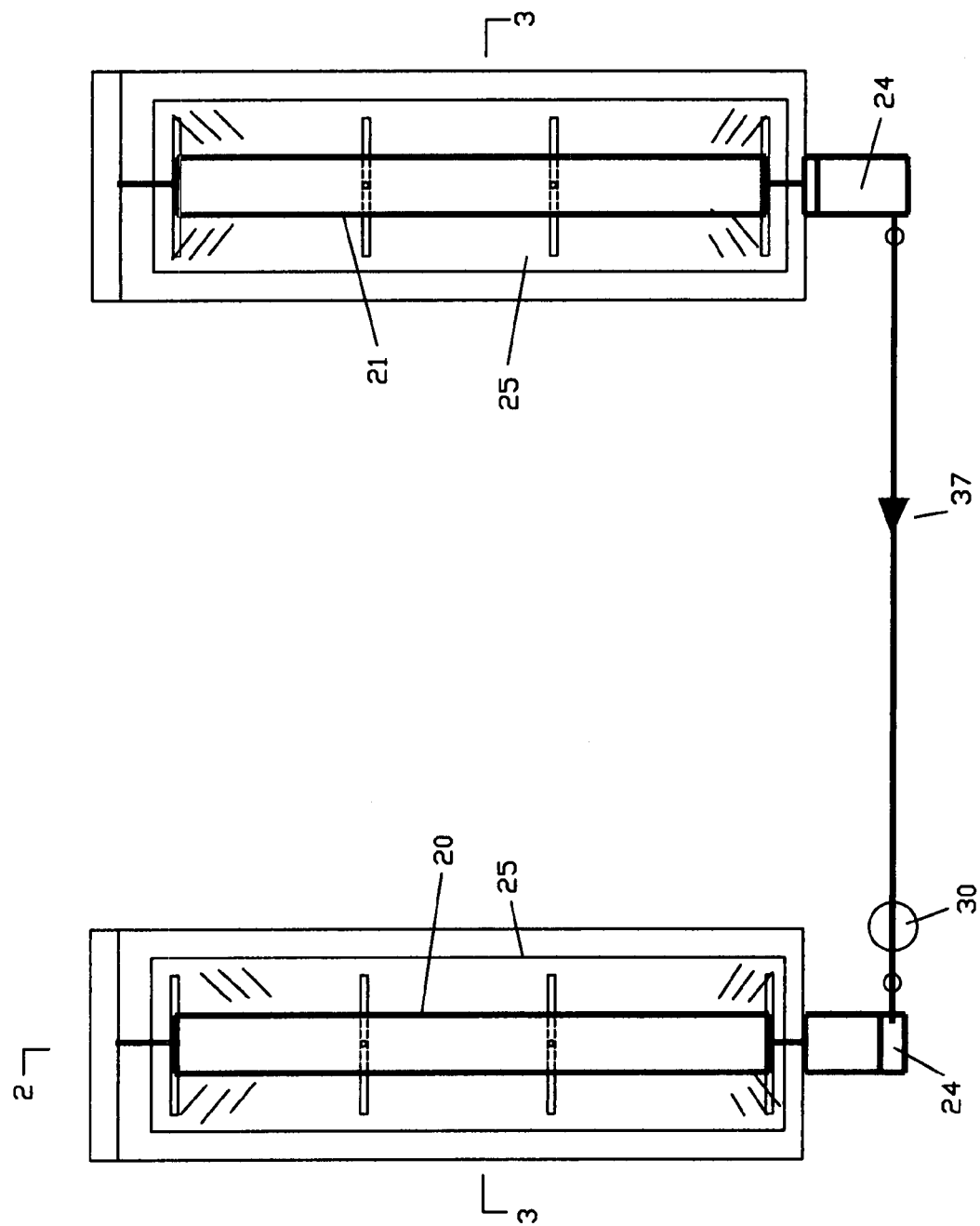
FIG. 4 is the plan view which shows the change in the liquid chamber after the liquid has been forced out of one tank into the other.

Refer to FIG. 4, there is illustrated a plan view which shows the tank system at the end of the heating and power producing cycle for tank 20 when most of the liquid in the liquid chamber 24 from tank 20 has been routed to tank 21 through the generator 30. Notice that the volumes of liquid in tank 21 has significantly increased while the volume of liquid in tank 20 has decreased significantly.

Figure 5:
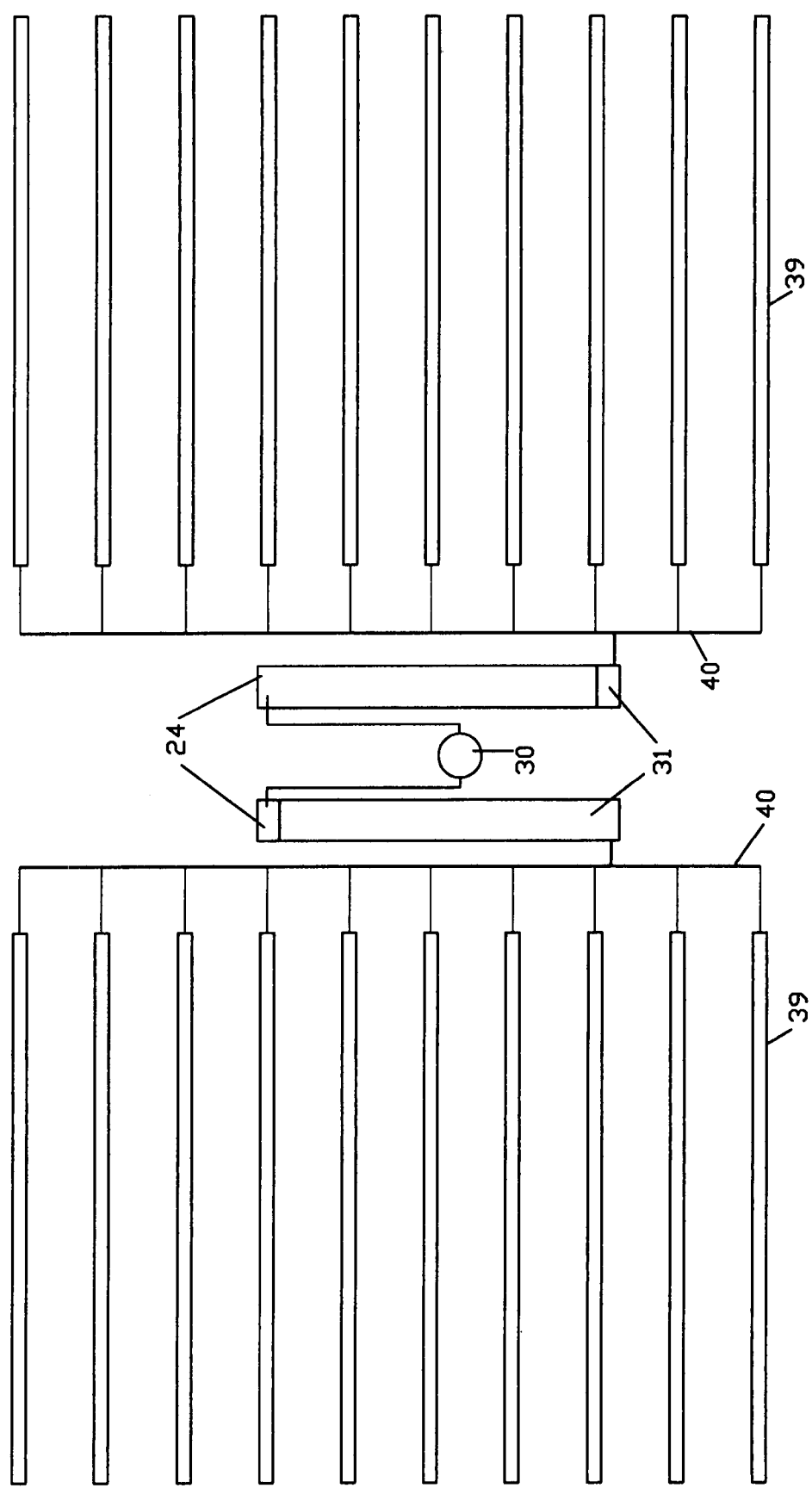
FIG. 5 shows a plan view of a network of tanks and pipes for this system.

Refer to FIG. 5, there is illustrated a plan view of a network of tanks 39 and a series of connecting pipes 40 that will route a liquid under pressure through a generator 30 during cycle times for this system of pipes and tanks. The method of producing electric energy is described above.

Solar heat is the primary source for this system as described herein. However, other sources of heat may be used in this system and would consist of thermal, (hot spings) or chemical (batteries).

The cycle of heating and cooling will depend on the time it takes to heat and cool the tanks to their optimum values.

Having described my invention, what I claim as new, and desire to secure by Letter of Patent is:

1. A closed thermodynamic hydraulic electric generating system and a process for generating electric power comprising:

a network of a heated and a cooled tanks connected together by pipes allowing to cycle a liquid from the heated tanks to the cooled tanks by a pressure of a gas and will produce an electric power when the liquid flows through a connecting generator;

wherein the heating of the tanks is done by a solar parabolic mirrors and the cooling of the tanks is done by a circulating fluid and a heat sinks;

wherein the system has a minimum of two tanks, each containing pressurized gas and liquid, wherein the tanks are interconnected by a pipe system and the gas in one tank is heated by the solar parabolic mirrors and the gas in the other connecting tank is cooled by the circulating fluid simultaneously, which causes a differential pressure change between the connecting tanks strong enough to force a flow of the liquid by the pressure of the gas from the heated tank to the cooled tank to produce electric energy when the liquid flows through a connecting generator.

* * * * *